US012809899B2

(12) United States Patent
Schoch et al.

(10) Patent No.: US 12,809,899 B2
(45) Date of Patent: Nov. 24, 2026

(54) INFORMATION RETRIEVAL FROM LLM IN INDUSTRIAL APPLICATIONS WITH REDUCED HALLUCINATION

(71) Applicant: ABB Schweiz AG, Baden (CH)

(72) Inventors: Nicolai Schoch, Heidelberg (DE); Ruomu Tan, Mannheim (DE); Reuben Borrison, Brühl (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 19/064,846

(22) Filed: Feb. 27, 2025

(65) Prior Publication Data

US 2025/0278422 A1 Sep. 4, 2025

(30) Foreign Application Priority Data

Feb. 29, 2024 (EP) .................................... 24160586

(51) Int. Cl.
*G06F 16/00* (2019.01)
*G06F 16/3329* (2025.01)
*G06F 16/334* (2025.01)

(52) U.S. Cl.
CPC .... *G06F 16/3346* (2019.01); *G06F 16/33295* (2025.01)

(58) Field of Classification Search
CPC ....................... G06F 16/3346; G06F 16/33295
USPC ........................................................ 707/748
See application file for complete search history.

(56) References Cited

U.S. PATENT DOCUMENTS

2023/0176557 A1* 6/2023 Cella .................... G05B 13/048 700/117
2024/0403341 A1* 12/2024 Berglund ............ G06F 16/3326
2024/0412720 A1* 12/2024 Vasylyev .......... G06F 16/90332
2025/0045313 A1* 2/2025 Rogynskyy .......... G06N 3/0475
2025/0272663 A1* 8/2025 Esmalifalak ..... G06Q 10/06313

OTHER PUBLICATIONS

Cohen et al., "LM vs LM: Detecting Factual Errors via Cross Examination," *arXiv preprint arXiv:2305.13281,* 18 pp. (May 22, 2023).

(Continued)

*Primary Examiner* — Monica M Pyo
(74) *Attorney, Agent, or Firm* — Fitch Even Tabin & Flannery LLP

(57) ABSTRACT

A method for retrieving information about an asset in an industrial plant includes providing a query and technical context information about at least one asset, to a large language model (LLM), obtain an answer to the query, wherein the context information relates to one or more of capabilities or requirements of the asset, how to interact with the asset, parameter values of the asset, and sensor data relating to the asset; setting up on the context information and the query and/or answer, a verification plan, the verification plan comprising one or more actions, wherein executing each action produces a confidence metric that is indicative of a propensity of the answer being correct; executing the verification plan, thereby obtaining confidence metrics; and determining, based on the confidence metrics, a propensity of the answer to the given query obtained from the LLM being correct.

19 Claims, 3 Drawing Sheets

(56) References Cited

OTHER PUBLICATIONS

Dhuliawala et al., "Chain-of-Verification Reduces Hallucination in Large Language Models," *arXiv preprint arXiv:2309.11495,* 19 pp. (Sep. 25, 2023).
Xia et al., "Towards autonomous system: flexible modular production system enhanced with large language model agents," *2023 IEEE 28th International Conference on Emerging Technologies and Factory Automation* (*ETFA*), 8 pp. (Sep. 12-15, 2023).
European Patent Office, Extended European Search Report in European Patent Application No. 24160586.4, 7 pp. (Jul. 12, 2024).

* cited by examiner

INFORMATION RETRIEVAL FROM LLM IN INDUSTRIAL APPLICATIONS WITH REDUCED HALLUCINATION

CROSS-REFERENCE TO RELATED APPLICATIONS

The instant application claims priority to European Patent Application No. 24160586.4, filed Feb. 29, 2024, which is incorporated herein in its entirety by reference.

FIELD OF THE DISCLOSURE

The present disclosure generally relates to retrieval of information that is relevant for the operation and monitoring of assets in industrial plants by means of large language models, LLMs.

BACKGROUND OF THE INVENTION

An industrial plant is not only made of industrial assets, such as valves, pumps, reaction vessels and sensors, but also of massive piles of information. Each asset by itself comes with detailed technical specifications and instructions how to use it. In addition, a lot of technical documentation accrues when engineering the industrial plant as a whole.

During day-to-day operation of the industrial plant, concrete questions arise that need to be resolved using information from said massive piles. For example, an operator may need to know how to access a particular feature in the user interface in the control system. But questions may also be more complex and span information relating to multiple assets, such as whether it is safe to perform an action that affects a section of the plant, or even the plant as a whole, in a particular operating situation. Finding and then evaluating all technical specifications that are pertinent to this question is an onerous manual task. Therefore, plant operators frequently rely on experience that allows them to take short-cuts in the analysis.

Large language models (LLMs) are an emerging tool for answering free-text questions on any topic that is covered by the material that has been used for their training. However, when reaching the limits of their capabilities, they do not just stop giving output or admit that they do not know the answer. Rather, they tend to output answers that look plausible but are factually incorrect. This is termed "hallucinating". It is in some way analogous to seemingly seeing an object in an image that is in fact just full of Gaussian noise. When relying on such an incorrect answer for operational decisions, the industrial plant may go into an emergency shutdown, or even a HSE (health, safety, and environment) may result.

BRIEF SUMMARY OF THE INVENTION

Systems and methods in accordance with the disclosure. assess the reliability of information about assets of an industrial plants that is obtained from a large language model, LLM. A computer-implemented method for retrieving information about at least one asset in an industrial plant is provided.

A method in accordance with the disclosure uses a large language model (LLM) that is configured and pre-trained to take a text prompt as input and repeatedly predict portions of text. A given query for the sought information is provided to this LLM, together with technical context information about at least one asset in the industrial plant, and optionally also with further technical context information about the industrial plant as a whole. The context information relates at least to one or more of: capabilities of the asset, requirements of the asset, how to interact with the asset, parameter values of the asset, and sensor data relating to the asset. In response to the query, the LLM will output an answer.

Based at least in part on the context information and one or both of the given query and the answer to this query obtained from the LLM, a verification plan is set up. This verification plan comprises one or more actions. Executing each action produces a confidence metric that is indicative of a propensity of the answer to the given query that has been obtained from the LLM being correct.

The verification plan is then executed. This results in one or more confidence metrics. Based at least in part on said confidence metrics, a propensity of the answer to the given query that has been obtained from the LLM being correct is determined.

The final propensity of the answer being correct may be computed from the individual confidence metrics in any suitable manner. For example, the individual confidence metrics may be aggregated, e.g., by averaging. But the final propensity may also, for example, be dominated by the worst confidence metric, to prevent this from being watered down simply by the presence of many more confidence metrics. For example, the minimum of the individual confidence scores may be used as the final propensity of the answer being correct. That is, if there is any doubt that the answer is correct, this doubt will be taken seriously.

BRIEF DESCRIPTION OF THE SEVERAL VIEWS OF THE DRAWING(S)

DETAILED DESCRIPTION OF THE INVENTION

Figure 1:
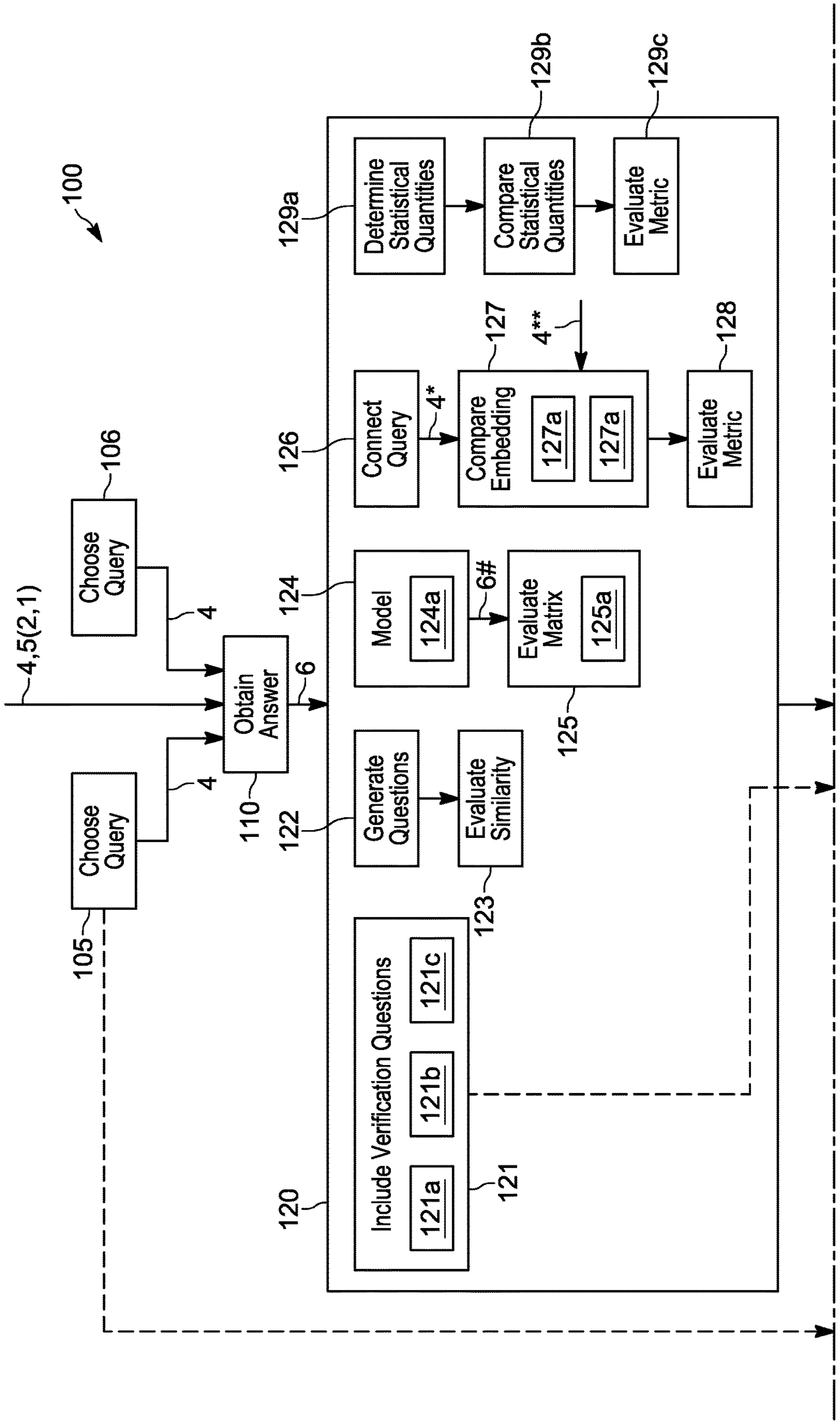
FIG. 1 is a flowchart for a method in accordance with the disclosure.
Figure 1:
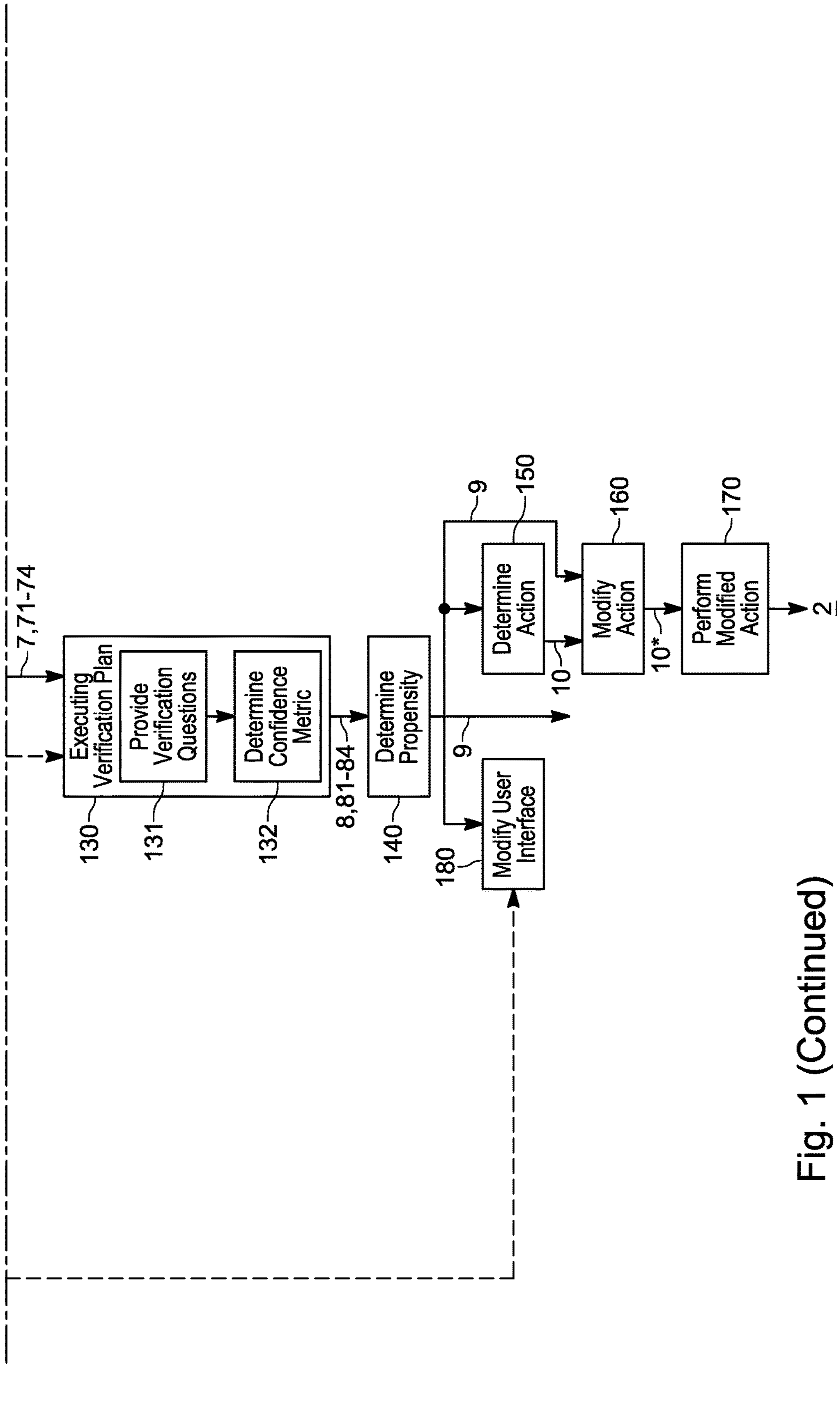
Figure 2:
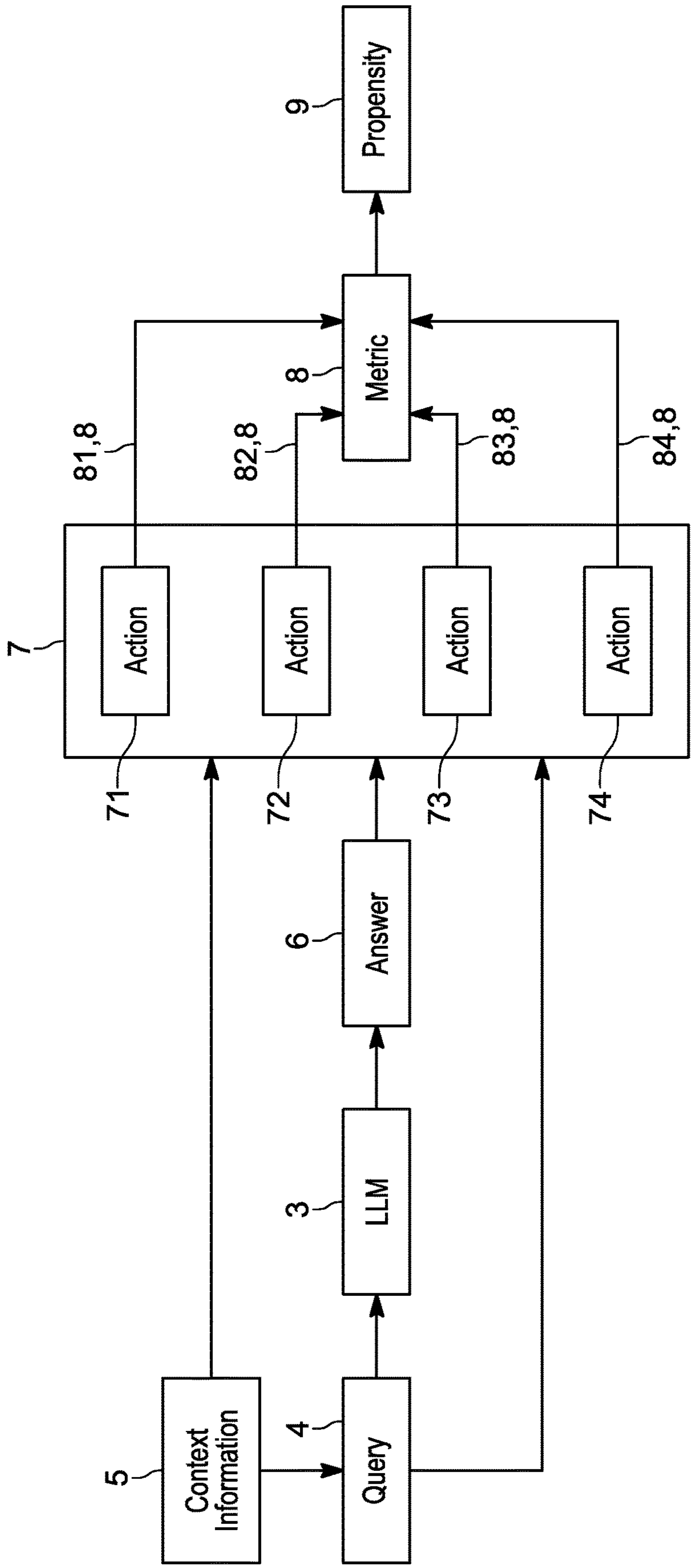
FIG. 2 is a block diagram for a system in accordance with the disclosure.

FIG. 1 is an exemplary embodiment of the method 100 for retrieving information about at least one asset 2 in an industrial plant 1; FIG. 2 is an exemplary manner of arriving at a final propensity 9 based on a verification 7 with multiple actions 71-74.

FIG. 1 is a schematic flow chart of an embodiment of the method 100 for retrieving information about at least one asset 2 in an industrial plant 1. In step 110, a given query 4 for information, as well as technical context information 5 about at least one asset 2, is provided to a large language model, LLM 3, which is configured to take a text prompt as input and repeatedly predict portions of text. In this manner, an answer 6 to the given query 4 is obtained. The context information 5 relates at least to one or more of: capabilities of the asset 2, requirements of the asset 2, how to interact with the asset 2, parameter values of the asset 2, and sensor data relating to the asset 2.

In step 120, a verification plan 7 is set up, based at least in part on the context information 5 and one or both of the given query 4 and the answer 6 to this given query 4. The verification plan 7 comprises one or more actions 71-74. Executing each action 71-74 produces a confidence metric 8, 81 84 that is indicative of a propensity of the answer 6 to the given query 4 obtained from the LLM 3 being correct.

According to block 121, the verification plan 7 may comprise at least a set of verification questions and expected answers. According to block 121*a*, at least one verification question is chosen (121*a*) such that agreement of an answer to this question with an expected answer is indicative of whether: the context information 5 contains the answer 6 to the given query 4; and/or the LLM 3 is capable of understanding the given query 4; and/or the LLM 3 can answer the given query 4 given the context 5; and/or the LLM 3 answers the given query 4 in a logically correct way.

According to block 121*b*, at least one verification question may be: a paraphrase of the given query 4; and/or generated based at least in part on the context 5 and optionally also the answer to the original query 4; and/or a question with an expected answer that is related to the given query 4.

According to block 121*c*, at least one expected answer to a verification question may be obtained by providing the context 5, and optionally the verification question, to an extractive language model that is configured to extract information from given text in words and phrases from this given text.

According to block 122, the verification plan 7 may comprise generating, by the LLM 3 to which the original query 4 was provided, and/or by a different LLM 3, at least one question based on the context information 5, and optionally also the answer 6 to the given query 4. A similarity of the so-generated question and the given query 4 may then be determined as a confidence metric 8 according to block 123.

According to block 124, one or more further answers 6# to the given query 4 given the context information 5 may, in the course of the verification plan 7, be obtained in a manner different from the LLM 3 to which the given query 4 was provided. A confidence metric 8 may then be evaluated from the so-obtained further answers 6# according to block 125.

According to block 124*a*, the further answers 6# may be extracted from the context information 5 by an extractive language model that is configured to extract information from given text in words and phrases from this given text.

According to block 125*a*, the evaluating of the confidence metric 8 may comprise evaluating to which extent: the original answer 6 to the given query 4 is reliable given the context information 5; and/or the given query 4 should have an answer 6 given the context information 5.

According to block 126, in the course of the verification plan 7, the given query 4 may be converted into an embedding 4* that is a numerical encoding for inputting the given query 4 into the LLM 3. This embedding 4* may then be compared to embeddings 4 of training examples used for training the LLM 3, according to block 127. According to block 128, a confidence metric 8** may then be evaluated from the result of this comparison.

According to block 127*a*, a cluster of the embeddings 4 of the training examples may be determined. According to 127***b*, a distance of the embedding (4*) of the given query (4) from this cluster may then be evaluated.

According to block 129*a*, in the course of the verification plan 7, one or more statistical quantities may be determined on the text of the answer 6 to the given query 4 on the one hand, and on the context information 5 on the other hand. According to block 129*b*, the so-obtained values of the one or more statistical quantities may then be compared. According to block 129*c*, a confidence metric 8 may then be evaluated from the result of this comparison.

In step 130, the verification plan 7 is executed. This results in one or more confidence metrics 8. According to block 131, if the verification plan 7 comprises verification questions with known expected answers according to block 121, these verification questions may be provided to the LLM 3 to which the given query was provided, and/or to a different LLM 3. According to block 132, the confidence metrics 8 may then comprise at least a measure for an extent to which the so-obtained answers to the verification questions are in agreement with the expected answers.

In step 140, based at least in part on the confidence metrics 8, a propensity 9 of the answer 6 to the given 4 query obtained from the LLM 3 being correct is determined. In the example shown in FIG. 1, in step 150, from the answer 6 to the given query 4, at least one action 10 that changes the physical state and/or behavior of the asset 2 to be performed on the at least one asset 2 is determined. In step 160, the so-determined action 10 is modified based at least in part on the propensity 9 of this answer 6 being correct. This modified action 10* may then be performed on the at least one asset 2 in step 170.

When, according to block 105, the query 4 relates to how to access a given functionality of the asset 2 via a user interface of the asset 2, in step 180, the user interface of the asset 2 may be modified based at least in part on the given query 4 and the obtained answer 6 to this given query 4 so as to make the given functionality better accessible in the user interface of the asset 2.

FIG. 2 illustrates in one example how the propensity 9 of an answer 6 to a query 4 may be obtained based on an exemplary verification plan 7 with four actions 71-74. The response 6 to the given query 4 is obtained by feeding the given query 4 to the LLM 3, together with technical context information 5. The verification plan 7 is set up based on the response 6, the context information 5, and the given query 4. In the example shown in FIG. 2, the verification plan 7 comprises four actions 71-74, for example:

- Given the <response>, what could be the question?→generate some questions (e.g., using any text-to-text model)→compare the questions against the original <question>→does the <response> answer the original <question>?
- Given the <context>, what questions can be answered?→generate some questions (e.g., using any text-to-text model)→compare the questions to the original <question>→ is the <context> suitable for answering the original <question>?
- Given the <context>→generate some more questions (e.g., using any text-to-text model) and answer them using both an Extractive Q&A LLM and the main Response Generation LLM→Compare the answers→Is the main LLM capable to answer questions from the given <context>?
- Given the <context> and the question, generate another answer using Extractive Q&A →How similar is the <response> to the extracted answer?/Can a <response> be generated for the <question> given the <context>?

Each action 71-74 produces an individual confidence metric 8, 81-84. From these individual confidence metrics 8, 81-84, one single confidence metric 8 is produced. For example, this confidence metric 8 may be the minimum (worst) of the individual confidence metrics 81-84. From this confidence metric 8, the final propensity 9 that the response 6 to the given query 4 is correct is computed.

The disclosure describes a computer-implemented method for retrieving information about at least one asset in an industrial plant. This method uses a large language model, LLM that is configured and pre-trained to take a text prompt as input and repeatedly predict portions of text. A given query for the sought information is provided to this LLM, together with technical context information about at least one asset in the industrial plant, and optionally also with further technical context information about the industrial plant as a whole. The context information relates at least to one or more of: capabilities of the asset, requirements of the asset, how to interact with the asset, parameter values of the asset, and sensor data relating to the asset. In response to the query, the LLM will output an answer.

Based at least in part on the context information and one or both of the given query and the answer to this query obtained from the LLM, a verification plan is set up. This verification plan comprises one or more actions. Executing each action produces a confidence metric that is indicative of a propensity of the answer to the given query that has been obtained from the LLM being correct.

The verification plan is then executed. This results in one or more confidence metrics. Based at least in part on the confidence metrics, a propensity of the answer to the given query that has been obtained from the LLM being correct is determined.

The final propensity of the answer being correct may be computed from the individual confidence metrics in any suitable manner. For example, the individual confidence metrics may be aggregated, e.g., by averaging. But the final propensity may also, for example, be dominated by the worst confidence metric, to prevent this from being watered down simply by the presence of many more confidence metrics. For example, the minimum of the individual confidence scores may be used as the final propensity of the answer being correct. That is, if there is any doubt that the answer is correct, this doubt will be taken seriously.

It was found that the use of the technical context information is a key ingredient for accurately assessing the propensity that the answer to the given query delivered by the LLM is correct. Even though LLMs have been trained with data from very many walks of life, this generic training alone is most likely not sufficient for answering specific queries relating to industrial assets. The reason is that not all knowledge on which the factually correct answer depends is publicly available, so that the LLM has had a chance to learn it during its pre-training. Rather, much of this knowledge will be material that is available only to owners of the respective assets, or even to the owner of the industrial plant. In particular, if the context comprises parameter values of the asset and/or sensor values of the asset, these data has arisen long after the LLM had been pre-trained. But there are many queries for which such context information is relevant. That is, one and the same answer may be perfectly correct in one context, but terribly wrong in another context.

A main use of retrieving information by making queries to the LLM is supporting an operator of the plant who wants to do something on the plant, or needs to know what is currently going on in the plant. The information may, in principle, be available somewhere in the plant, but it may be difficult to find it in the plethora of information. For example, every field device, controller or other equipment in use in the plant may come with its own manual, and there may be superordinate documentation on the engineering of the plant as a whole. It may not be evident at first sight which manual(s) needs to be consulted to solve a particular problem.

In a simple example, a query may comprise whether it is safe to open a particular door, hatch, flange or similar part of an enclosure around a compartment. The answer will depend on, e.g., whether there is a pressure or temperature differential between inside and outside of the compartment, whether there is a hazardous substance inside the compartment, whether the opening of the compartment will expose hazardous voltages, and whether the industrial process that is being executed on the plant as a whole will tolerate that the compartment is open and temporarily out of commission for the process.

In a more complex example, a query may comprise whether it is safe to temporarily shut down a section of the industrial plant, or even the industrial plant as a whole, and how to accomplish this. For example, electricity prices fluctuate throughout the day, and during certain peak hours, prices may be several times higher than during off-peak hours. Many plants that are very large-scale consumers of electricity even operate under contracts that allow the electricity supplier to temporarily shed the large load at peak times with a few minutes' warning. There are operating states in which the plant may tolerate such a temporary shutdown, and operating states in which such a temporary shutdown will cause severe equipment damage. For example, if a crucible or other vessel contains molten material (such as glass or metal), this molten material must be removed before the vessel cools down below the melting point of the material, or the material will solidify and ruin the vessel forever. Also, there may be constraints as to how fast the temperature may be changed per unit time.

By making the context information available to the LLM, both static information, such as technical documentation about assets or about the plant as a whole, and dynamic information indicating parameters and operating states are made searchable using natural language queries. The verification plan builds on the same context information that was also used to produce the original answer. That is, the propensity of the answer being correct is always assessed given the context.

In another example, it is possible that the context found in the document library is seemingly relevant to the question but does not contain the information that is needed to answer the question (which may be due to that the information is actually not available in the database). For example, if the operator questions "how should I determine when to carry out a maintenance on the sensor?" It is possible that the LLM found the user manual for the sensor, which contains the technical specifications of the sensor, instructions for installation and calibration, and the lifespan of the sensor bot not the maintenance procedure of the sensor. Nevertheless, the LLM, when presented with the context, can derive some instructions based the context, which are not necessarily reliable. Therefore, it is important to verify if the context contains the information that can be used to answer the prompt given by the user. User manuals and maintenance manuals are frequently separate documents, one intention being not to entice the user to carry out maintenance by himself that should be done by qualified service personnel.

In a particularly advantageous embodiment, the verification plan comprises at least a set of verification questions and expected answers. Executing this verification plan then comprises at least providing verification questions to the LLM to which the given query was provided, and/or to a different LLM. The confidence metrics then comprise at least a measure for an extent to which the so-obtained answers to the verification questions are in agreement with the expected answers.

The reasoning behind this is, if the LLM is hallucinating in the sense that it is giving out factual incorrect answers, it is very likely that, when being asked more questions on the topic, it will run into inconsistencies and contradictions. Even a deliberate attempt to erect a consistent building of lies regarding a particular topic is terribly difficult. For this reason, many criminals have already been caught and convicted using verification questions regarding what they just said. For example, if someone claims to have been at a certain place at a particular time, a verification question might be, “Did you visit venue X when you were there?” If the suspect then says, “Yes, yes, it was absolutely fabulous!”, but venue X was closed at the time in question (which is why the interrogator chose it in the first place), the suspect is a goner. In the industrial field, there are similar possibilities to cast doubt on the answer to the original query. For this, the expected answers do not need to be very concrete. It may suffice to know only what not to expect as an answer. For example, if the LLM is asked how to clean a vacuum chamber, it might initially respond “Use a cloth soaked in olive oil and light pressure. Olive oil will dissolve many contaminants, such as cyanoacrylate superglue.” An exemplary verification question might then be “I want to use olive oil on a vacuum chamber on the factory floor. Where do I get some?” If the initial answer to the given question is right, it can be expected that the answer to the verification question will be a concrete location where olive oil is kept. But it is more likely that the answer will be something like “No food or drink is allowed anywhere on the factory floor. If the inside of a vacuum chamber is contaminated with foodstuffs, and in particular fatty or oily substances, disassembly of the chamber and thorough manual cleaning piece by piece will be required.”

There are more useful applications of verification questions beside the uncovering of contradictions. For example, verification questions may be chosen such that agreement of an answer to this question with an expected answer is indicative of whether the context information contains the answer to the given query. As discussed before, in many use cases, the whole point of the LLM is to exploit the context information that is already available and make it searchable, not to introduce new insights from the public knowledge that has gone into the pre-training of the LLM. If the context information does not contain the answer to the given query, and at the same time the given query is so specific that it cannot be answered using publicly available knowledge alone, the probability is high that the LLM will cough up some incorrect answer.

Another point to verify using verification questions is whether the LLM is capable of understanding the given query in the first place. If this is not the case, then the answer cannot be trusted. For example, if the initial query relates to how to use a certain entity, such as a level gauge, a verification question might relate to what the purpose of a level gauge is. Whoever does not know this cannot be trusted to know how to use the level gauge.

It may also be investigated with verification questions whether the LLM can answer the given query given the context. To this end, for example, verification questions whose answers are clearly evident from the context information may be created. If the LLM cannot answer these questions, it is probably not understanding the context information correctly.

In another example, verification questions may be chosen such that their expected answers indicate whether the LLM answers the given query in a logically correct way. For example, if the answer of the LLM to the question how to clean a vacuum chamber is to use a wire brush, then verification questions may relate to whether one may use a washing-up brush or a toilet brush to clean the inside of a vacuum chamber. The expected answer would then be that, in principle, yes, a brush is a brush and the alternative brushes should work as well, but they are made of plastic and care must be taken not to lose any pieces of this plastic inside the chamber because it will emit very nasty contaminants upon the next bake-out of the chamber.

In a further particularly advantageous embodiment, at least one verification question is a paraphrase of the given query. In this manner, the answer to the given query may be directly re-used as the expected answer to the verification question.

In another example, at least one verification question may be generated based at least in part on the context and optionally also the answer to the original query. In this manner, it can be further investigated whether the LLM is really familiar with the subject-matter it is talking about.

In another example, at least one verification question may have an expected answer that is related to the given query. That is, the original query may, to some extent, be asked again in reverse. This provides a particularly advantageous way to check for inconsistencies and contradictions.

In a particularly advantageous embodiment, at least one expected answer to a verification question is obtained by providing the context, and optionally the verification question, to an extractive language model that is configured to extract information from given text in words and phrases from this given text. This limitation of the extractive language model ensures that the expected answer is not tainted with any publicly available knowledge that has gone into the training of the LLM. This is in some way analogous to an exam situation where the situation depicted in the exam paper is to be taken as a given, and the exam taker is supposed not to introduce any knowledge that he knows from any other source.

The verification plan may contain even more ways of obtaining confidence metrics besides the asking of verification questions.

In a particularly advantageous embodiment, as part of the verification plan, at least one question is generated by the LLM to which the original query was provided, and/or by a different LLM, based on the context information, and optionally also the answer to the given query. A similarity of the so-generated question and the given query is then determined as a confidence metric. In particular, in this manner, circular consistency of the LLM may be measured in the sense that, starting from one point and going on a circular path, one should arrive at roughly the same point. Also, it can be measured which questions the LLM in fact claims itself to be capable of answering. The LLM may even be directly asked to provide examples of questions that it is able to answer given a certain context.

In a further particularly advantageous embodiment, as part of the verification plan, one or more further answers to the given query given the context information are obtained in a manner different from the LLM to which the given query was provided. From the so-obtained further answers, a confidence metric is evaluated. In particular, this confidence metric may depend on whether the further answers are in agreement with the answer initially obtained from the LLM. If the initial answer is factually correct, there should at least be no contradictions with the further answers obtained in a different manner. Rather, there should be only differences in that the one answer is more concrete than the other.

In particular, the evaluating of the confidence metric may comprise evaluating to which extent: the original answer to the given query is reliable given the context information; and/or the given query should have an answer given the context information.

In particular, if the original answer is reliable, then the further answers should be more or less in line with the original answers. By contrast, if the given query should not have an answer given the context information, i.e., if the context is insufficient for answering the question, then the further answers should diverge from the original answer because there is no common basis for them.

In one example, the further answers are extracted from the context information by an extractive language model that is configured to extract information from given text in words and phrases from this given text. As discussed before, this ensures that the further answers are not biased by any uncontrolled knowledge that has gone into the training of the LLM.

In a further particularly advantageous embodiment, the verification plan further comprises: converting the given query into an embedding that is a numerical encoding for inputting the given query into the LLM; comparing this embedding to embeddings of training examples used for training the LLM; and evaluating a confidence metric from the result of this comparison.

In this manner, it may be measured whether the given query is in the distribution of the training examples, or whether it is outside this distribution. This measures whether the LLM has learned to handle queries of a particular abstract task that is independent from the concrete context. For example, one such abstract kind of task may be to understand a text about an entity and then determining, based on this text, properties of this entity.

In a simple example, given a manual of a distributed control system, the LLM can be expected to be proficient in the field of distributed control systems, but it will not be proficient in, e.g., holiday destinations.

For example, the comparing to the embeddings of trainings examples may comprise determining a cluster of the embeddings of the training examples. One possible way of doing this is performing k-means clustering of the training examples with a target of forming only one single cluster. A distance of the embedding of the given query from this cluster may then be evaluated. From this distance, the confidence metric may be determined. For example, the confidence metric may decrease if the distance is above a predetermined threshold.

In a further particularly advantageous embodiment, as part of the verification plan, one or more statistical quantities on the text of the answer to the given query on the one hand, and on the context information on the other hand, may be determined. Examples for such statistical quantities include the term frequency and inverse document frequency, Tf-idf, that is used to rate the relevancy of terms; and word probability distributions.

The so-obtained values of the one or more statistical quantities may be compared. Based on the result of this comparison, a confidence metric may be evaluated. In this manner, it may be tested whether the answer to the given query is in the domain of text defined by the available context.

The context information may be of any suitable kind. For example, it may comprise a technical specification, a device description, and/or a manual of the asset, and/or a layout of the industrial plant as a whole. The context information is not even limited to unstructured textual information. For example, it may also comprise structured text information, graph-based information, or other modalities, which are processed into further-processable information (e.g., again, embedding vectors) by their respective format- and modality-dependent transformer models. One example for this are piping and instrumentation diagrams, P&ID, of the plant topology. E.g., when having a question on a plant topology (say, a reactor), a P&ID document may well serve as document, being parsed/represented using a state-of-the-art image processing (transformer) model, so that the image-contained information (say, that the reactor is connected via a valve to a tank) can be used as context.

In a further particularly advantageous embodiment, from the answer to the given query, at least one action that changes the physical state and/or behavior of the asset to be performed on the at least one asset is determined. The so-determined action is then modified based at least in part on the propensity of this answer being correct. For example, an action that might turn out to be harmful for the plant if it is not appropriate in the situation at hand may be modified to a less dangerous action that will not cause harm even if it is not fully appropriate.

Thus, in a further particularly advantageous embodiment, the method may further comprise performing the modified action on the at least one asset. In a further particularly advantageous embodiment, given query is chosen to relate to how to access a given functionality of the asset via a user interface of the asset. In this manner, the answer to this given query will help a user of the user interface to access this functionality quicker. A high propensity that the answer is correct will then translate into a higher confidence that, when the user is following the advice as per the answer, the action that is performed in the user interface is the one that the user actually intended to perform. The facilitating of access is particularly advantageous for features of the asset that are rarely used and therefore buried rather deep in the user interface, such as changing the network configuration of the asset or changing the measurement unit system between metric units and US customary units. This saves time on the side of the user and also on the side of customer support. When supporting complex consumer software, many support requests for having features added to the software relate to features that are already in the software, but could not be found by the user.

In a further particularly advantageous embodiment, the user interface of the asset is modified based at least in part on the given query and the obtained answer to this given query, so as to make the given functionality better accessible in the user interface of the asset. In this manner, functionalities that were originally intended to be rarely used may be put into a more prominent and easier accessible place if it turns out that the feature needs to be used more often than originally intended.

In a further particularly advantageous embodiment, the given query is chosen to relate to whether the at least one asset, and/or the industrial plant as a whole, is in an abnormal operating state. In this manner, the method may be used for the ongoing monitoring of individual assets or of the plant as a whole. The determined propensity of the answer from the LLM being correct then translates into higher probability that any decisions made because of the answer, such as initiating maintenance of one or more assets, are in fact appropriate given the concrete operating situation.

This is in some way analogous to how observant drivers operate their cars. Many drivers do not understand much about the inner workings of the car, but they may notice, in terms of a different dynamic reaction of the car or in terms of an unusual noise, that something just isn't right and they should see a mechanic. Frequently, it then turns out that there is indeed something amiss.

Because it is computer-implemented, the present method may be embodied in the form of a software. The invention therefore also relates to a computer program with machine-readable instructions that, when executed by one or more computers and/or compute instances, cause the one or more computers and/or compute instances to perform the method described above. Examples for compute instances include virtual machines, containers or server-less execution environments in a cloud. The invention also relates to a machine-readable data carrier and/or a download product with the computer program. A download product is a digital product with the computer program that may, e.g., be sold in an online shop for immediate fulfilment and download to one or more computers. The invention also relates to one or more compute instances with the computer program, and/or with the machine-readable data carrier and/or download product.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SIGNS

1 industrial plant
2 industrial asset 2 in industrial plant 1
3 large language model, LLM
4 given query

4* embedding of given query 4
4** embeddings of training examples
5 technical context information
6 answer to given query 4
6# further answers obtained in different manner
7 verification plan
71-74 actions in verification plan
8 confidence metric
81-84 confidence metrics of individual actions 71-74
9 propensity of answer 6 being correct
10 to-be-performed action
10* modified action
100 method for retrieving information about asset 2
105 choosing query 4 relating to accessing functionality
106 choosing query 4 relating to anomaly detection
110 obtaining answer 6 from LLM 3
120 setting up verification plan 7
121 including verification questions in verification plan 7
**121*a*** choosing particular verification questions
**121*b*** different manners of verification questions
**121*c*** obtaining expected answers with extractive language model
122 generating new questions based on context information 5
123 evaluating similarity of new questions and original query 4
124 obtaining further answers 6# in different manner
**124*a* using extractive language model for obtaining further answers 6#**
125 evaluating confidence metric 8 from further answers 6#
**125*a* manners of evaluating confidence metric 8**
126 converting query 4 into embedding 4*
127 comparing embedding 4* to embeddings 4**
**127*a* determining cluster of embeddings 4****
**127*b* evaluating distance of embedding 4*** from cluster
128 evaluating metric 8 from result of comparison
**129*a*** determining statistical quantities
**129*b*** comparing statistical quantities
**129*c* evaluating confidence metric 8** from result of comparison
130 executing verification plan 76
131 providing verification questions to LLM 3
132 determining confidence metric 8 based on answers to verification questions
140 determining propensity 9
150 determining action 10
160 modifying action 10
170 performing modified action 10*
180 modifying user interface of asset 2

What is claimed is:

1. A computer-implemented method for retrieving information about at least one asset in an industrial plant, comprising:

providing, to a large language model (LLM) that is configured to take a text prompt as input and repeatedly predict portions of text, a given query for information, as well as technical context information about at least one asset, thereby obtaining an answer to the given query, wherein the context information relates at least to one or more of: capabilities of the asset, requirements of the asset, how to interact with the asset, parameter values of the asset, and sensor data relating to the asset;

setting up, based at least in part on the context information and one or both of the given query and the answer to this given query, a verification plan, the verification plan comprising at least two actions, including a first action comprising providing at least one verification question having a predetermined expected answer, and a second action comprising obtaining at least one further answer to the given query from the context information using an extractive language model, wherein executing each of the first and second actions produces a confidence metric that is indicative of a propensity of the answer to the given query obtained from the LLM being correct;

executing the verification plan, thereby obtaining one or more of the confidence metrics; and determining, based at least in part on the one or more confidence metrics, a final propensity of the answer to the given query obtained from the LLM being correct.

2. The method of claim 1, wherein at least one verification question is chosen such that agreement of an answer to this question with an expected answer is indicative of whether the context information contains the answer to the given query; and/or the LLM is capable of understanding the given query; and/or the LLM can answer the given query given the context; and/or the LLM answers the given query in a logically correct way.

3. The method of claim 1, wherein at least one verification question is a paraphrase of the given query; and/or generated based at least in part on the context and optionally also the answer to an original query; and/or a question with the predetermined expected answer that is related to the given query.

4. The method of claim 1, wherein the verification plan further comprises generating, by the LLM to which an original query was provided, and/or by a different LLM, at least one question based on the context information, and also the answer to the given query; and determining a similarity of the at least one question and the given query.

5. The method of claim 1, wherein the verification plan further comprises obtaining, in a manner different from the LLM to which the given query was provided, one or more further answers to the given query given the context information; and evaluating a confidence metric from the at least one further answer.

6. The method of claim 5, wherein the evaluating of the confidence metric comprises evaluating to which extent an original answer to the given query is reliable given the context information; and/or the given query has an answer given the context information.

7. The method of claim 5, wherein the further answers are extracted from the context information by an extractive language model that is configured to extract information from given text in words and phrases from this given text.

8. The method of claim 1, wherein the verification plan further comprises converting the given query into an embedding that is a numerical encoding for inputting the given query into the LLM; comparing this embedding to embeddings of training examples used for training the LLM; and evaluating a confidence metric from a result of this comparison.

9. The method of claim 8, wherein the comparing to the embeddings of training examples comprises determining a cluster of the embeddings of the training examples; and evaluating a distance of the embedding of the given query from this cluster.

10. The method of claim 1, wherein the verification plan further comprises determining one or more statistical quantities on the text of the answer to the given query, and on the context information; comparing values of the one or more statistical quantities; and evaluating the confidence metric from a result of this comparison.

11. The method of claim 1, wherein the context information comprises a technical specification, a device description, and/or a manual of the asset, and/or a layout of the industrial plant as a whole.

12. The method of claim 1, further comprising determining, from the answer to the given query, at least one action that changes a physical state and/or behavior of the asset to be performed on the at least one asset; and modifying the at least one action that changes the state based at least in part on the propensity of this answer being correct.

13. The method of claim 12, further comprising performing the modified action on the at least one asset.

14. The method of claim 1, wherein the asset is a module of a modular industrial plant, or any other field device that is in physical interaction with an industrial process being executed on the industrial plant.

15. The method of claim 1, wherein the given query is chosen to relate to how to access a given functionality of the asset via a user interface of the asset.

16. The method of claim 15, further comprising modifying the user interface of the asset based at least in part on the given query and the obtained answer to this given query, so as to make the given functionality better accessible in the user interface of the asset.

17. The method of claim 1, wherein the given query is chosen to relate to whether the at least one asset, and/or the industrial plant as a whole, is in an operating state potentially requiring maintenance operations.

18. The method of claim 1, wherein the propensity of the answer to the given query obtained from the LLM being correct is computed as an aggregate of individual confidence metrics, or a minimum of all individual confidence metrics.

19. A non-transitory computer storage media containing machine-readable instructions that, when executed by one or more computers and/or compute instances, cause the one or more computers and/or compute instances to perform a method for retrieving information about at least one asset in an industrial plant, the method comprising:

providing, to a large language model (LLM) that is configured to take a text prompt as input and repeatedly predict portions of text, a given query for information, as well as technical context information about at least one asset, thereby obtaining an answer to the given query, wherein the context information relates at least to one or more of: capabilities of the asset, requirements of the asset, how to interact with the asset, parameter values of the asset, and sensor data relating to the asset;

setting up, based at least in part on the context information and one or both of the given query and the answer to this given query, a verification plan, the verification plan comprising at least two actions, including a first action comprising providing at least one verification question having a predetermined expected answer, and a second action comprising obtaining at least one further answer to the given query from the context information using an extractive language model, wherein executing each of the first and second actions produces a confidence metric that is indicative of a propensity of the answer to the given query obtained from the LLM being correct;

executing the verification plan, thereby obtaining one or more confidence metrics; and determining, based at least in part on the one or more confidence metrics, a final propensity of the answer to the given query obtained from the LLM being correct.

* * * * *